A. W. ROSE.
Electric Speaking Telephone.
No. 231,239.  Patented Aug. 17, 1880.
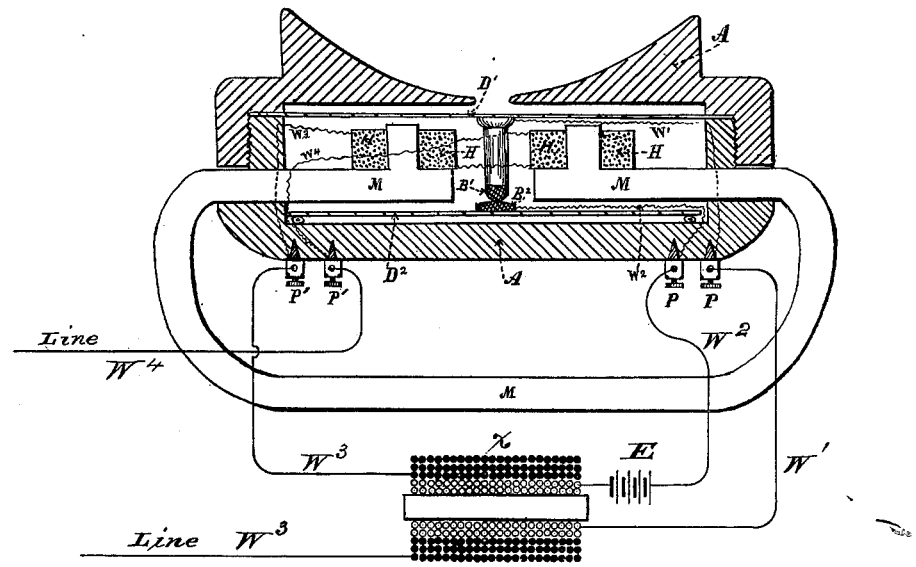
Witnesses.
Geo. H. Evans
A. Gref Jr.
Inventor.
A. W. Rose
By his Attorney
E. N. Dickerson

UNITED STATES PATENT OFFICE.

ALLEN W. ROSE, OF NEW YORK, N. Y., ASSIGNOR TO CHARLES A. CHEEVER.

ELECTRIC SPEAKING-TELEPHONE.

SPECIFICATION forming part of Letters Patent No. 231,239, dated August 17, 1880.

Application filed October 27, 1879.

*To all whom it may concern:*

Be it known that I, ALLEN W. ROSE, a citizen of the Dominion of Canada, but a resident of the city, county, and State of New York, (Case B,) have invented certain new and useful Improvements in Electric Speaking-Telephones, of which the following is a specification.

My invention more especially relates to telephones of the class combining in one instrument means for varying a magneto-electric current and means for varying the strength of a continuous battery-current flowing through contact-points in an electric circuit.

The object of my invention, speaking generally, is to increase the efficiency of electric speaking-telephones of the class above mentioned, while obviating the disadvantages to which they have heretofore been subject, and to combine in one instrument apparatus capable of being used either as a receiver, a transmitter, or a telephonic relay or repeater. These ends I attain by mounting in the case or support of the telephone a diaphragm carrying a contact-point connected with one pole of the battery, a second diaphragm carrying another contact-point connected with the other pole of the battery, and a magnet interposed between the diaphragms and carrying induction-coils in an independent circuit.

The subject-matter claimed is specified in the claims at the end of this specification.

The connections of the transmitting and receiving instruments are made independent, as will be seen by observing the drawing, which represents a vertical central section through my improved telephone, showing the coil of the magnetic receiver, its magnets, the resistance-buttons, induction-coils, and circuit-connections.

A represents generally the case of the telephone. D' and D² are diaphragms having attached to their centers contact or pressure buttons B' B². These buttons are respectively connected, by wires W' W², with screw-caps or binding-posts P P, and through them with the battery E and primary wire of the induction-coil X.

M is a magnet which has on its poles helices H. The poles of the magnet M are placed in such relation with the diaphragm D' that when the electric impulses are received through the coil or helices H from the line-wire W³ W⁴, the diaphragm is caused to vibrate correspondingly.

The wires W³ W⁴ are connected with the line-wire and the secondary wire of the induction-coil X, the primary wire of which is connected with the wires W' W² and battery E.

By means of an apparatus connected as shown in the drawing, I have found, in practice, that I produce a very effective transmitting-telephone, while it is also a very good receiver. The operation of the apparatus as a transmitter combines a magneto with a battery transmitter, the primary of the induction-coil being connected with the battery E and the pressure or resistance buttons B' B², while the line is connected by the caps P' with the outer coil or secondary of the induction-coil. It is evident, therefore, that either the coil H or the button B', as connected, would serve independently as a transmitter. I consider this arrangement of circuits to be very valuable.

I claim as of my invention—

1. The combination, substantially as hereinbefore set forth, of the case, the two diaphragms mounted therein, the contact-points or resistance-buttons carried by the diaphragms, their connecting-wires and battery with the electro-magnet, its helices and connecting-wires.

2. The combination, substantially as hereinbefore set forth, in one instrument of a battery-telephone, including two diaphragms, each carrying a contact-point and a magneto-telephone having its coils interposed between the diaphragms.

3. The combination, substantially as hereinbefore set forth, of the case, the two diaphragms mounted therein, their contact-points or resistance-buttons, the battery, and the primary circuit of a separate induction-coil with a magneto-telephone, the coils of which are interposed between the diaphragms included in the secondary circuit of said induction-coil.

ALLEN W. ROSE.

Witnesses:
 WM. S. BEAMAN,
 ANTHONY GREEF, Jr.